United States Patent [19]

Robertaccio

[11] Patent Number: 4,794,720
[45] Date of Patent: Jan. 3, 1989

[54] INFLATED ARTIFICIAL FISH BAITS AND METHODS OF FABRICATION

[76] Inventor: Frank V. Robertaccio, Box 4, Dutch Hill Rd., Forestport, N.Y. 13338

[21] Appl. No.: 173,568

[22] Filed: Mar. 25, 1988

[51] Int. Cl.$^4$ ............................................. A01K 85/00
[52] U.S. Cl. ...................................... 43/42; 43/42.29; 43/43.14; 43/43.6
[58] Field of Search ............... 43/43.14, 43.16, 42.37, 43/42.38, 44.8, 42.1, 44.2, 44.99, 42.43, 43.6, 42.28, 42.29, 4.5, 42

[56] References Cited

U.S. PATENT DOCUMENTS

| | | | |
|---|---|---|---|
| 890,549 | 6/1908 | Zamel | 43/42.1 |
| 1,291,614 | 1/1919 | Noxon | 43/44.2 |
| 2,600,673 | 6/1952 | Murray | 43/42.1 |
| 2,817,179 | 12/1957 | Kelley | 43/44.99 |
| 2,968,113 | 1/1961 | Multanen | 43/42.37 |
| 3,883,979 | 5/1975 | Williams | 43/42.53 |
| 4,648,194 | 3/1987 | Carroll | 43/4.5 |

FOREIGN PATENT DOCUMENTS

| | | | |
|---|---|---|---|
| 1133699 | 10/1982 | Canada | 43/42.37 |
| 1021663 | 3/1966 | United Kingdom | 43/42.1 |

Primary Examiner—Gene P. Crosby
Attorney, Agent, or Firm—Charles S. McGuire

[57] ABSTRACT

An artificial bait for fishing that simulates a fish egg or other natural bait made by inflating a balloon or similar object with a pressurized fluid and then tying or otherwise closing it off. The filled balloon portion and knot or closure may be removed from the uninflated portion of the balloon and placed on a fish hook passing through the knot/closure, or a tail portion of uninflated material on the opposite side of the knot/closure from the inflated body. Rather than tying the balloon material on itself to form a knot/closure in the usual manner, it may be tied about the fish hook in the intended position of use.

27 Claims, 2 Drawing Sheets

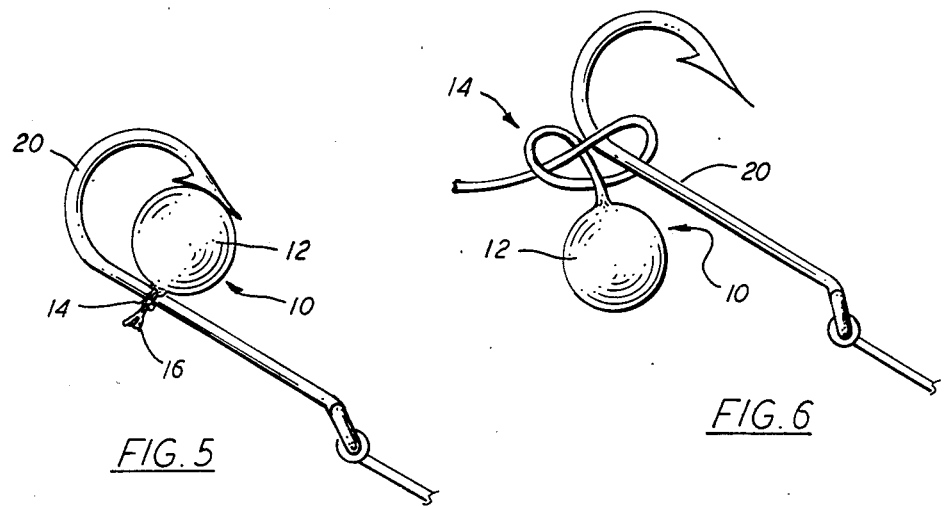
FIG. 5
FIG. 6
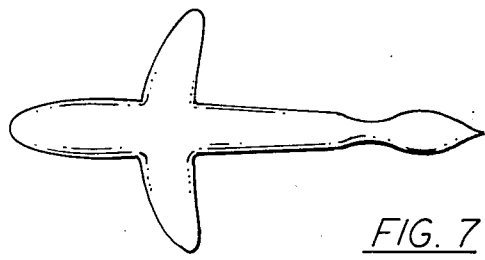
FIG. 7
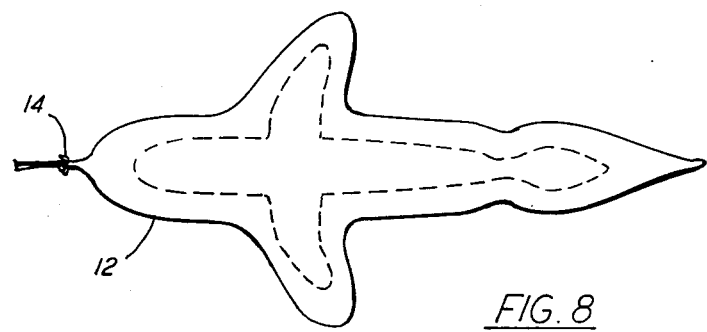
FIG. 8

INFLATED ARTIFICIAL FISH BAITS AND METHODS OF FABRICATION

FIELD OF INVENTION

This invention relates to artificial bait for fishing, and more particularly to novel methods and articles for providing artificial bait which is exceptionally buoyant, to novel methods and articles simulating natural fish eggs and artificial bait representing jig heads, natural bait and other fish attractants, and to novel methods for providing artificial bait which is supple, soft, translucent, weedless, snagless and which may be selectively orientated on hooks, lures, and other terminal tackle.

DESCRIPTION OF PRIOR ART

Both natural and artificial bait, including both real and artificial fish eggs, as well as jigs, lures and the like have been used to catch fish. Natural bait must be kept fresh or preserved to be of any use and is often difficult to put on the hook, does not stay put where placed, can only be placed in certain positions on the hook, and frequently falls off the hook when fishing. Furthermore, the weight of both natural and previously known artificial baits causes the hook to be less bouyant than is desired in many situations, often times resulting in loss of bait and terminal tackle by snagging. Previously known artificial baits are often lacking in fish catching ability due to lack of realistic bouyancy, weight, and feel. Fishermen may find that fish often nibble and move away from the artificial bait, strike short or avoid the artificial bait altogether due to lack of realistic bouyancy, weight and feel. Previously known artificial baits do not replicate the fish attracting signals of the air-filled bladder of bait fish, and the low density of other natural bait. Furthermore, they often fall short of sending fish attracting sounds and vibrations due to lack of buoyancy, low density, proper surface tension and suppleness. Some natural baits are somewhat translucent, and previously known artificial baits fall short of duplicating this translucency. Natural baits sometimes interfere with hooking ability by partially or completely filling the gap between hook shank and barb, which gap size is designed for optimizing hooking ability. Previously known artificial baits often utilize additional fish attractant attachments to the hooks. This may be in the form of a manufactured attachment such as beads, tiny spoons dangling from the hook shank, or in the form of a natural bait attachment, such as worms or an additional artificial bait such as plastic worms. Such previously known attachments, while they may improve fish catching ability, do not add to buoyancy and control hook orientation to reduce the possibility of snagging or picking up weeds and, at the same time, enhancing fish hooking ability. Further, previously known artificial bait attachments and natural and artificial baits themselves normally do not fill the gap between hook shank and barb to provide a weedless hook without severely hampering fish hooking ability. The more convenient, previously known artificial baits often fall short in realistic shape, texture and visual attractiveness. On the other hand, convenience of most previously known artificial baits is also less than desired due to storage inconvenience, such as bulk, dangling hooks, potential damage to finish, as well as the expense of supplying in sufficient range of sizes, shapes, colors, shades and the like.

OBJECTS AND ADVANTAGES

Among the objects and advantages of the invention are the following:

to provide an artificial fish bait that is exceptionally buoyant;

to provide an artificial fish bait that allows for buoyancy and weight adjustment by filling with various types and amounts of fluids and solids;

to provide an artificial fish bait that has a realistic natural bait feel;

to provide an artificial fish bait that sends fish attracting sounds and vibrations due to the desired buoyancy, density, surface tension, suppleness and elasticity;

to provide an artificial fish bait that has low density for attracting fish;

to provide an artificial fish bait that is translucent;

to provide an artificial fish bait that is easy to put on hook and stays put where placed on hook, line, other artificial baits, and terminal tackle;

to provide an artificial fish bait that can be selectively oriented with respect to the hook, i.e., on either the inside or outside area of hook;

to provide an artificial fish bait that enhances the hooking ability of an associated fish hook by controlling hook orientation in the water in any plane wished, i.e., in a vertical plane with barb above shank or a vertical plane with barb below shank, and hook and bait will not spin or twist line;

to provide an artificial fish bait that allows for snagless fishing by controlling hook orientation, i.e., barb above shank;

to provide an artificial fish bait that allows for said bait to be presented to fish before hook due to the combination of exceptional bouyancy; ability to be placed on outside area of hook; and ability to stay put where placed;

to provide an artificial fish bait that is weedless due to its ability to be placed between barb and shank of hook and its elastic qualities;

to provide an artificial fish bait that simulates fish eggs, salamanders, worms, snakes, frogs, bugs, mice and other natural baits;

to provide an artificial fish bait that can be used, e.g., as a jig head, lure, fly, head, body, tail, on other artificial baits and their hooks; and with artificial and natural bait attachments to itself;

to provide an artificial fish bait that is convenient, i.e., does not require dangling hook storage; can be stored without worry of damage to finish by abrasion with other tackle; is not bulky or heavy even in large quantities and size and color assortments;

to provide an artificial fish bait that can be equally advantageous with all the fishing methods including fly, spinn, casting, still, trolling, snagging, drifting, bait fishing, lifting and the like;

to provide an artificial fish bait that can be filled or coated with fish attractant lure and scents, i.e., can be filled w/catfish and carp dough balls and can be pierced to allow quicker scent release;

to provide an artificial fish bait that can have any of the various tails as an attachment or its own elastic tail, i.e., legs, tentacles, hula skirts, wings;

to provide an artificial fish bait that can be used as a "slinky", i.e., a pencil sinker, by filling the uninflated balloon type artificial bait with lead shot or other weighted material and will not quickly snag due to its elastic, non-abrasive shell; and to provide an inflated artificial fish bait in which the bouyancy, size, color, translucency, softness/hardness (feel), and other features can all be controlled and adjusted as desired when inflated by the fisherman or tyer, or when filled during manufacture.

Further objects and advantages of the invention will be apparent from a consideration of the ensuing description and the accompanying drawings.

SUMMARY OF THE INVENTION

In accordance with the foregoing objects, the invention contemplates an artificial bait formed of an elastomeric material, and haviing a body inflated by a pressurized fluid in various shapes to attract fish. The artificial bait may conveniently be formed from readily available materials simply by inflating the tip, i.e., the closed end portion, of a conventional, elongated balloon to a size and shape preferably approximating that of a natural fish bait of the type being simulated or of a size and shape which will attract fish for the type of fishing intended. The inflated material is then tied, either upon itself, upon a releasably attached hook, or closed with a separate string, plastic closure or other material, to prevent escape of the pressurized fluid, and may then be cut from any remaining, uninflated material. Other materials and methods of inflation may be used, e.g., providing a porous material such as shaped balsum wood within an elastic skin and inflating through the elastic membrane with a pressurized fluid such as air, carbon dioxide, or other gases, or mixtures of such to produce the prefered size and shape of the artificial bait. In any of the various processes, a closure, appurtenance, or knot is formed or placed for releasably attaching a fish hook.

Artificial baits having the desired qualities for many fishing applications may simply be inflated with air, but to provide differing degrees of buoyancy, appearance and hardness, the inflating fluid may be a gas other than air, a liquid, a solid or a gas-liquid mixture. A portion of uninflated material is often provided on the opposite side of the knot or closure from the inflated body to provide further means for placing the artificial bait on a fish hook by passing the hook through such material and for providing tails of various sorts.

BRIEF DESCRIPTION OF THE DRAWINGS

FIG. 4 also represents the orientation of this hook with attached artificial bait when being pulled through the water by the fisherman;

FIG. 5 shows the articifial bait within the inside area of the hook in a manner resulting in a weedless bait; and FIG. 6 shows the artificial bait being knotted around a fish hook; and FIGS. 7 and 8 illustrate another embodiment of artificial bait, formed by an alternate process.

DETAILED DESCRIPTION

Figure 1:
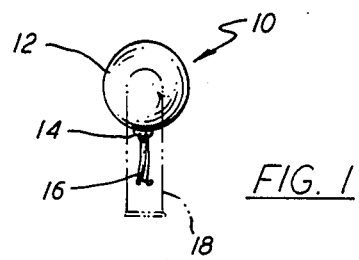
FIG. 1 shows in solid lines a preferred form of artificial fish bait in the form of a jig head or fish egg, which bait has been formed by inflating the tip of a balloon, shown in phantom lines in the uninflated condition.

Referring now to the drawings, in FIG. 1 is shown a simulated fish bait according to the preferred embodiment of the invention, denoted generally by reference numeral 10. In this embodiment, the bait comprises a spheriodally shaped body 12 of elastic material, inflated to a diameter in the preferred range of about $\frac{1}{4}$ to 1 inch by a pressurized fluid. Body 12 is closed by knot 14 or other closure, essentially preventing escape of the fluid. The pressurized fluid may be either liquid, gas or a combination of both depending on the desired bouyancy and other features of bait 10. The elastic material may be rubber latex or any similar material having an initial shape that will form a spheriod or other preferred shapes once inflated and closed off.

On the opposite side of the knotted or closed end portion from body 12, bait 10 may have a tail 16 of desired length, of uninflated material. The "phantom-lines" of FIG. 1 are representative of an uninflated balloon 18 of the elongated type commonly known as a "pencil" or "twisty" balloon, from which the artificial bait is formed to simulate a fish egg. This type of balloon may be manufactured in a shorter version (e.g. about 4") for ease of use, packaging, and to reduce cost. It may also be narrowed and given a slightly larger, bubble end for ease of use. It may also be reshaped and resized for this particular artificial bait application.

Figure 2:
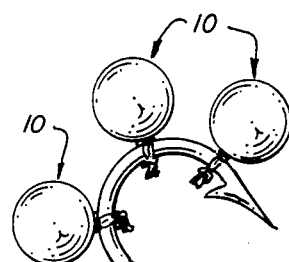
FIG. 2 shows three (3) artificial baits, in spheroid form as in FIG. 1, positioned on a fish hook in the outside hook area.
Figure 3:
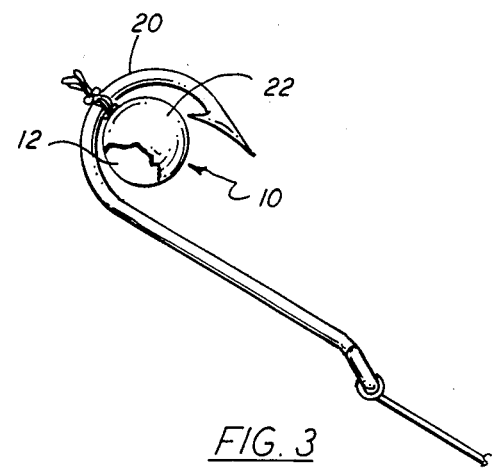
FIG. 3 shows an artificial fish bait positioned on a hook in the inside hook area.
Figure 4:
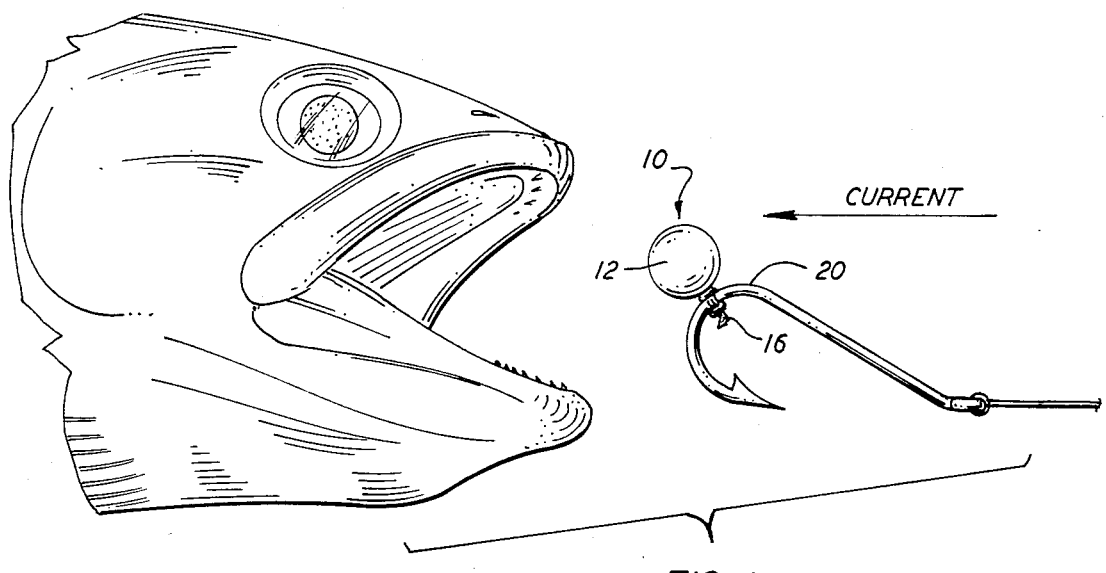
FIG. 4 shows an artificial bait positioned in the outside area of a hook with the bait presented to the fish before the hook in current.

A single, artificial bait, or plurality thereof, may be releasably attached to a fish hook 20 by piercing the bait either through knot 14, or through tail portion 16. A plurality of baits 10 are shown in FIG. 2, attached to the outside of hook 20, and a single bait 10 is shown in FIG. 3 attached to the inside area of hook 20. The buoyancy provided by bait 10 is useful in many instances to provide a desired orientation of hook 20 as, for example, when fishing in waters where current is present, or when line is being brought in by the fisherman as shown in FIG. 4. That is, the combined buoyant effect of egg 10 and the speed and direction of the current or the bringing in of the line will insure that the egg is presented to the fish, which are often facing in the upstream direction for feeding, in advance of the hook and with barb above or below shank as in FIG. 4.

The preferred method of fabricating the artificial bait, and assembling it with a hook or other tackle, involves inflating and tying off the end portion of an elongated-type balloon to a diameter of about $\frac{1}{4}$ to 1 inch, and cutting it off from the remainder of the balloon to provide a fish bait. The user/manufacturer may close off the inflated portion by tying a knot in the uninflated portion, but may find other closure means equally effective. The closure and tail end will also serve as an attachment mechanism to receive a fish hook. The fish hook is placed through the closure or tail, as shown in the drawings or the knot is formed around the fish hook shank and then tightened as shown in FIG. 6.

The user may place the artificial bait in any desired position on the fish hook and the bait will stay exactly where placed, as shown, for example, in FIGS. 2 and 3. The artificial bait may be placed on other than a single, bare hook, i.e., it may be placed on other terminal tackle or leader or line for fish attraction, buoyancy, visibility, effect, orientation, and the like. Some examples are on lures, with other bait, as a jig head, to eliminate snagging (FIG. 4) but preferably with barb above shank, to make weedless (FIG. 5), to see line movement strike, and it may be used in egg sacs and bait sacs as egg sac/bait sac floater.

The user/manufacturer may inflate the balloon or other elastic material with gases (e.g., carbon dioxide, helium, air) or liquids, or a combination thereof, to achieve the desired bouyancy, size, translucency, and softness/hardness (feel). Alternatively, inflation may be performed through the elastic membrane of this body portion without need of a closure for filling, but only an appertenance to the body for hook attachment. The prefered method of manufacturing the artificial bait in this manner is to form a porous, solid material in the desired shape but somewhat smaller than the completed artificial bait. The porous material, such as balsuum, styrofoam, etc., is covered by an elastic skin, completely enclosing the porous material and an elastic or other hook-pierceable appurtanance attached to the skin. A pressurized fluid is then allowed to enter through the skin/membrane over time. The porous material within the skin will allow the fluid inside the skin to increase in pressure. When the pressure of the fluid outside the skin is reduced to atmospheric pressure the skin will expand, retaining generally the shape of the porous material inside. This pressurizing, depressurizing process is repeated until the desired size artificial bait is obtained. FIGS. 7 and 8 illustrate an artificial bait in the simulated form of a salamander being produced in this manner. Since the buoyancy provided by the inflated body portion is one of the principal advantageous features of the invention, it is often desireable to fabricate the artificial bait in such a manner, by control of size-weight ratio, that they have a specific gravity less than one.

When using the so called "pencil" balloons to make the simulated fish egg, the uninflated balloons may also be used as a so-called "slinky" for less bottom snags, etc. Presently, hollow nylon rope and plastic tubes with weights inside are sold as "slinkys", i.e., lead shot or other weighted material may be placed in the pencil balloon type body to be used as a pencil weight (slinky) for abrasion resistant, snag resistant sinker.

The artificial bait can be manufactured and sold in preinflated form, with and without combination with the hook, and may therefore be internally and/or externally protected to extend shelf-life with any pore-filling material or coating protection such as oil, fish attractor liquid, wax, plastic, etc. Both a pore filling and other type coating can be used in conjunction, e.g., first oil and/or fish attractor liquid, for extended shelf-life and lubrication, and then wax for handling convenience. A partial wax coating 22 is shown, by way of example, on the body portion of the egg in FIG. 3.

As an alternative to coating the bait with an oily substance, one or more thereof may be packaged and stored prior to use in a container of such substance, or of water, alcohol, antifreeze, or a combination of any of these or similar substances. Another method of packaging is that of pressurizing the container; a combination of the above may also be used. A container which can be re-pressurized by the fisherman by tightening the top is another such storage method.

While the above description contains many specificities, the reader should not construe these as limitations on the scope of the invention, but merely as exemplifications of the preferred embodiment thereof. Those skilled in the art may envision many other possible variations that are within its scope. For example, once inflated, bodies, tails, legs, hulaskirts, etc., may be added by the user for additional fish attraction. The balloons, color and coating choices are infinite, although the preferred color would be that which would most closely approximate the color of natural fish bait, for example a reddish-orange color for certain salmon eggs or a color which would attract fish for the particular fishing condition. Accordingly, the scope of the invention is to be determined by the appended claims and their legal equivalents, and not by the examples that have been given.

What is claimed is:

1. An artificial fish bait comprising:
   a. a body portion of elastomeric material;
   b. a pressurized fluid within said body portion;
   c. an end portion closing said body portion and essentially preventing escape therefrom of said pressurized fluid; and
   d. means attaching said artificial bait to an end portion of terminal fishing tackle.

2. Artificial fish bait as defined by claim 1 wherein said terminal tackle comprises a fish hook releaseably attached to said bait by piercing said end portion with the pointed end of said fish hook.

3. Artificial fish bait as defined by claim 1 wherein said end portion is formed by tying said elastic material in a knot upon itself.

4. Artificial fish bait as defined by claim 3 to further including a tail portion on the opposite side of said knot from said body portion.

5. Artificial fish bait as defined in claim 4 and further including a fish hook about which said knot is tied.

6. Artificial fish bait as defined by claim 1 wherein said body portion is spheroidally shaped.

7. Artificial fish bait as defined by claim 6 wherein said spheroidally shaped body portion has a diameter in the range from about ¼ to 1 inch.

8. Artificial fish bait as defined by claim 7 wherein said spheroidally shaped body portion has a color that closely resembles the color of a natural fish egg.

9. Artificial fish bait as defined in claim 1 and further including a coating covering at least one of the external and internal surfaces of said body portion.

10. Artificial fish bait as defined in claim 9 wherein said coating is a gel material which essentially seals any pores in said elastomeric material.

11. Artificial fish bait as defined in claim 9 wherein said coating is wax.

12. A method of making artificial fish bait comprising the steps of:
   a. inflating an elastic material with a pressurized fluid to form a body portion of predetermined shape;
   b. tying off an end portion of said elastic material to essentially prevent the escape of said pressurized fluid from said body portion; and
   c. attaching said artificial bait to an end portion of terminal fishing tackle.

13. The method of claim 12 wherein said pressurized fluid is air.

14. The method of claim 12 wherein the specific gravity of said bait is less than one.

15. The method of claim 12 wherein said end portion is tied off to provide a tail portion of uninflated elastic material on the opposite side of said tied off end portion from said body portion.

16. The method of claim 15 and including the further step of releasably attaching said bait to a fish hook.

17. The method of claim 16 wherein said bait is attached to said fish hook by piercing said tail portion with the barbed end of said hook.

18. The method of claim 16 wherein said bait is attached to said fish hook by tying off said tail portion around a portion of said hook.

19. The method of claim 12 and including the further step of applying a coating to said bait.

20. The method of claim 19 wherein said coating is a pore-blocking substance which assists in preventing the escape of said fluid from said body portion.

21. The method of claim 20 and including the further step of applying a secondary coating to at least said body portion.

22. The method of claim 12 and including the further step of storing said bait, prior to use, submerged in a container of a pore-blocking substance.

23. The method of claim 12 and including the further step of storing said bait, prior to use, in a container which is pressurized above atmospheric pressure.

24. The method of claim 12 wherein said predetermined shape is spheroidal.

25. A method of making artificial fish bait of predetermined shape comprising:
   (a) forming a porous, solid material in said predetermined shape, but smaller than said bait;
   (b) enclosing said shaped material within a closed skin of elastic material which is pervious to fluid at a pressure above atmospheric;
   (c) placing said enclosed shaped material in a fluid having a pressure above atmospheric whereby, over time, said fluid passes through said elastic material and into said shaped material; and
   (d) removing said enclosed shaped material from said fluid whereby, upon exposure to atmospheric pressure, said elastic material expands in substantially said predetermined shape.

26. The method of claim 25 wherein said predetermined shape is that of a natural fish bait.

27. The method of claim 26 and further including attaching said bait to terminal fishing tackle.

* * * * *